US008010644B1

(12) United States Patent
Zang et al.

(10) Patent No.: US 8,010,644 B1
(45) Date of Patent: Aug. 30, 2011

(54) METHOD AND SYSTEM FOR DEPLOYING A NETWORK MONITORING SERVICE WITHIN A COMMUNICATION NETWORK

(75) Inventors: Hui Zang, Burlingame, CA (US); Antonio Nucci, Burlingame, CA (US)

(73) Assignee: Sprint Communications Company L.P., Overland Park, KS (US)

( * ) Notice: Subject to any disclaimer, the term of this patent is extended or adjusted under 35 U.S.C. 154(b) by 1429 days.

(21) Appl. No.: 11/063,755

(22) Filed: Feb. 23, 2005

(51) Int. Cl.
G06F 15/173 (2006.01)
(52) U.S. Cl. .............................. 709/223; 705/8; 705/400
(58) Field of Classification Search .................. 709/224, 709/238; 705/8, 400, 28–30
See application file for complete search history.

(56) References Cited

U.S. PATENT DOCUMENTS

| | | | | |
|---|---|---|---|---|
| 5,426,674 A * | 6/1995 | Nemirovsky et al. | ......... | 709/241 |
| 5,473,599 A * | 12/1995 | Li et al. | ......... | 370/219 |
| 6,189,043 B1 * | 2/2001 | Buyukkoc et al. | ......... | 709/241 |
| 6,285,748 B1 * | 9/2001 | Lewis | ......... | 379/112.01 |
| 6,310,883 B1 * | 10/2001 | Mann et al. | ......... | 370/408 |
| 6,498,786 B1 * | 12/2002 | Kirkby et al. | ......... | 370/322 |
| 6,578,013 B1 * | 6/2003 | Davis et al. | ......... | 705/26 |
| 6,678,876 B2 * | 1/2004 | Stevens et al. | ......... | 716/12 |
| 6,732,349 B1 * | 5/2004 | Sun et al. | ......... | 716/16 |
| 6,894,972 B1 * | 5/2005 | Phaal | ......... | 370/229 |
| 6,904,544 B2 * | 6/2005 | DeRolf et al. | ......... | 714/43 |
| 7,002,960 B1 * | 2/2006 | Golan et al. | ......... | 370/393 |
| 7,187,652 B2 * | 3/2007 | Lee et al. | ......... | 370/238 |
| 7,228,564 B2 * | 6/2007 | Raikar et al. | ......... | 726/23 |
| 7,334,225 B2 * | 2/2008 | Boonie et al. | ......... | 717/171 |
| 7,483,861 B1 * | 1/2009 | Joiner et al. | ......... | 705/52 |
| 2002/0087696 A1 * | 7/2002 | Byrnes | ......... | 709/226 |
| 2003/0031167 A1 * | 2/2003 | Singh et al. | ......... | 370/352 |
| 2003/0142808 A1 * | 7/2003 | Hollman et al. | ......... | 379/221.01 |
| 2005/0286434 A1 * | 12/2005 | McKee et al. | ......... | 370/252 |
| 2006/0165003 A1 * | 7/2006 | Partridge | ......... | 370/248 |

* cited by examiner

*Primary Examiner* — John Follansbee
*Assistant Examiner* — Madhu Woolcock

(57) ABSTRACT

The present invention provides a method and a system for deploying a network monitoring service within a communication network. In accordance with the present invention, the method identifies the location types within the network and the associated costs of service installation for each location type. The method analyzes the traffic types present at each location type and determines the location type with the lowest cost for the selected traffic type. In another aspect of the invention, various methods to determine network devices to deploy a network monitoring service for the lowest cost are described.

11 Claims, 11 Drawing Sheets

# METHOD AND SYSTEM FOR DEPLOYING A NETWORK MONITORING SERVICE WITHIN A COMMUNICATION NETWORK

CROSS-REFERENCE TO RELATED APPLICATIONS

None.

STATEMENT REGARDING FEDERALLY SPONSORED RESEARCH OR DEVELOPMENT

None.

TECHNICAL FIELD

The present invention relates to deploying a network monitoring service within a communication network. More particularly, the present invention relates to a system and method for determining locations to deploy a network monitoring service covering a specific percentage of traffic for the lowest cost.

BACKGROUND OF THE INVENTION

Communication networks are composed of a number of devices for routing traffic commonly known as routers. Various types of routers offer a multitude of capabilities and services to route traffic within the network. Often, a network operator will need to monitor traffic loads within the network. Router manufacturers offer service packages to monitor and analyze the traffic within the network, but a full implementation on each and every router within the network can be costly in both financial and network resources.

Operating a large IP network without a detailed, network-wide knowledge of the traffic demands is challenging. An accurate view of the traffic demands is crucial for a number of important tasks, such as failure diagnosis, capacity planning and forecasting, routing and load-balancing policy optimization, attack identification, etc. In the past network operators responded to this problem practically by increasing link and router capacity and theoretically by investing time and resources to research new techniques to obtain accurate estimation of traffic demands. A lot of work has been done on traffic matrix estimation using traffic models combined with statistical inference techniques. All of these methods are prone to moderately large errors (errors in the range of 10-25% are typical). Moreover, none of these techniques is able to predict sudden changes in traffic demands due to unusual user behaviors or attacks conducted against the network.

SUMMARY OF THE INVENTION

The present invention provides a method and a system to deploy a network monitoring service within a communication network.

BRIEF DESCRIPTION OF THE SEVERAL VIEWS OF THE DRAWINGS

The present invention is described in detail below with reference to the attached drawing figures, wherein.

DETAILED DESCRIPTION OF THE INVENTION

Figure 1:
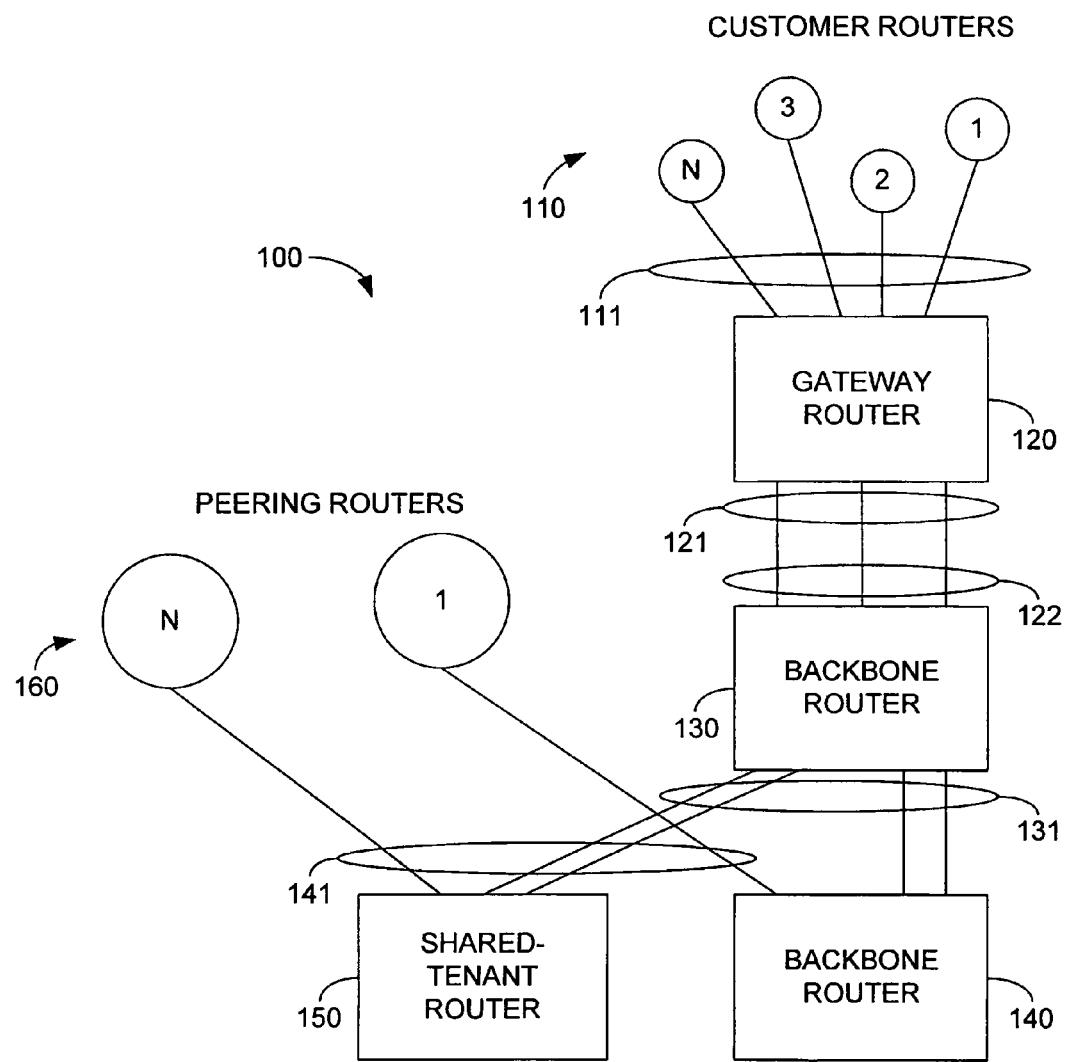
FIG. 1 illustrates an IP communication network architecture in accordance with the present invention.

The present invention provides a method and a system for deploying a network monitoring service within a communication network.

It is obvious to network operators that measuring traffic demands is a necessity and Cisco's NetFlow provides one answer to this problem. NetFlow enables services such as network monitoring, accounting and billing, peering agreement enforcement and security analysis that can be used by network operators to better engineer their backbones.

NetFlow is a set of features available on Cisco routers and other switching devices which provide network operators with access to IP flow information from their data networks. NetFlow infrastructure consists of two main components: NetFlow Data Export (NDE) and NetFlow Collector (NFC). The NDE is a module configured on routers and captures each IP flow traversing a router. An IP flow is identified as the combination of seven fields as Source and Destination IP addresses, Source and Destination Port numbers, IP protocol type, ToS bytes and Input Logical Interface. When a timer expires or the NetFlow cache becomes full, IP flow statistics, such as number of IP flows, number of packets and bytes associated to each flow, source/destination AS numbers, source/destination prefix masks, etc, are exported to a NFC.

IP networks generally contain a large diversity of routers. Some of these routers cannot support NetFlow and need to be upgraded to a newer configuration, while others can potentially support NetFlow but care must be taken since turning on this feature could either severely impact their performance or the packet forwarding process, causing losses and large packet latency or generating inaccurate flow statistics.

Enabling NetFlow at specific router interfaces is not sufficient. The IP flow statistics exported by NDE modules at each router must be collected by NFCs. Network operators process all the data stored in NFCs to gather the information they need. NetFlow Data Analyzer (NDA) is a NetFlow-specific traffic analysis tool that enables the operators to retrieve, display, and analyze NetFlow data collected from several NFC modules. There are two problems when NFCs are considered. First, only a limited number of routers can be served by the same NFC. Second, network operators prefer to have NFCs placed locally with respect to the routers equipped with NDEs in order to avoid the flooding of large amount of information over long-haul IP links.

Therefore, in order to enable NetFlow and utilize the data properly, network operators need to identify a proper configuration for each router enabled to support NetFlow Data Export (NDE) and a proper location for each NetFlow Collector (NFC).

The present invention identifies which types of routers should be targeted and which specific routers should be enabled to support NetFlow, and the associated configurations, such to cover a major fraction of network traffic while minimizing the total capital investment required. This problem is referred to as the NetFlow Deployment Problem (NDP). The solution to this problem will assist a network operator in two situations: i) For an operator who has decided to deploy NetFlow, identify the proper locations of routers to enable NetFlow to achieve a lowest capital investment; ii) For an operator who has not decided to deploy NetFlow, obtain a partial NetFlow deployment to achieve a best-coverage with a limited investment for the operator to examine the functions and benefits of NetFlow.

The current invention describes specifically Cisco NetFlow and IP networks for demonstrating how location optimization for a given network functionality should be pursued. This is accomplished without losing the generality that the method presented can also be applied to other services and features in other types of networks. While Cisco NetFlow represents one set of network monitoring services for Cisco routers, other similar services are available for other manufacturer's devices. For example, similar flow monitoring services are available from Foundry Networks and Extreme Networks, and JFlow is a monitoring service available for use on Juniper routers. The present invention addresses deployment issues that are present regardless of specific manufacturer or specific service and therefore may be applied to deployments of other services besides Cisco NetFlow.

Solving this problem for an operator's network raises a number of questions. What is the most suitable network location to enable NetFlow such to reach a good trade-off in terms of capital investment required and a wide vision of traffic earned by the network, i.e. customer and peering traffic? How many and which routers must be NetFlow enabled? Under which traffic conditions can each router safely support NetFlow without negative impact to the packet forwarding process? Which routers need an upgrade of the configuration and what configuration should be used? Where to locate the NetFlow Collectors needed to collect all flow statistics exported by NetFlow and how to assign each router to a specific NetFlow Collector?

A formal statement of the NetFlow Deployment Problem (NDP) is as follows.

Given:

The routers in a network $\mathcal{R}=\{R_1, R_2, \ldots, R_N\}$, and for each router $R_i \in \mathcal{R}$, set of interfaces $\mathcal{I}^{R_i}=\{I_1^{R_i}, I_2^{R_i}, \ldots, I_S^{R_i}\}$.

A set of PoPs $\mathcal{P}=\{P_1, P_2, \ldots, P_L\}$, and for each $P_i$, the set of routers associated: $\mathcal{R}^{P_i} \subset \mathcal{R}$. $\mathcal{R}^{P_i} \cap \mathcal{R}^{P_j}=\phi$ for $\forall i,j: i \neq j$ and $\cup_{1 \leq i \leq L} \mathcal{R}^{P_i}=\mathcal{R}$.

A traffic type set $\mathcal{T}=\{T_1, T_2, \ldots, T_M\}$ and a specific traffic type $T^* \in \mathcal{T}$ A cost function F for any router $R_i$ to have NetFlow enabled at a subset of interfaces $\mathcal{I}'^{R_i} \subset \mathcal{I}^{R_i}$, $F: \mathcal{R} \times \mathcal{I} \to \mathcal{Z}^+ \cup \{0\}$, where $\mathcal{Z}^+$ denotes the set of positive integers, and $\mathcal{I}=\cup_{1 \leq i \leq N} \mathcal{I}^{R_i}$.

A cost function C for the collectors deployed at PoP $P_i$ when $F(F \geq 0)$ routers in $\mathcal{R}^{P_i}$ are NetFlow-enabled, $C: Z^+ \cup \{0\} \to \mathcal{Z}^+ \cup \{0\}$.

A coverage ratio $D: 0 \leq D \leq 1$

The problem is to find a subset of routers $\mathcal{R}'=\{R'_1, R'_2, \ldots, R'_{N'}\} \subset \mathcal{R}$ such that for each $R'_i$, NetFlow is enabled on a non-empty subset of interfaces $\mathcal{I}'^{R'_i} \subset \mathcal{I}^{R'_i}$, and at least D of $T^*$ is covered by NetFlow, while at the same time, minimizing $$\sum_{1 \leq i \leq N'} F(R'_i, \mathcal{I}'^{R'_i}) + \sum_{1 \leq j \leq L} C(|\mathcal{R}' \cap \mathcal{R}^{P_j}|),$$

where |•| denotes the cardinality of a set.

The current invention consists of two main modules: the Network Analysis Module (NAM) and the NetFlow Location Module (NLM). The main function of the NAM is to identify a set of routers and interfaces by which the targeted traffic is switched independently, i.e. for two routers $R_1$ and $R_2$ identified, there is no flow $f \in T^*$ that is switched by both $R_1$ and $R_2$ in the same ingress/egress direction. The goal of this requirement is to guarantee that the sum of traffic from the identified routers and interfaces counts any flow once and only once. With the set of routers and interfaces, the NLM works on only data from these routers, interfaces and the given type of traffic.

The function of NLM is to cover D of Traffic T* on the identified set of routers and interfaces. It further consists of two engines: the Data Processing Engine (DPE) generates a set of input data to the Optimal NetFlow Location Problem (ONLP) Solving Engine (OSE), for a given set of performance thresholds, by taking multiple sources of input: i) router configuration files, SNMP data, CPU/memory data from routers, ii) lessons learned from a testbed and Cisco documentation on the necessary conditions for routers to support NetFlow, and iii) Cisco pricing on various router upgrades and NetFlow Collector. Router configurations, SNMP data, CPU/memory data and packet traces are also used in the testbed. OSE, which takes D of traffic T*, outputs the total cost, the NetFlow locations, and the number of collectors at each PoP.

The following paragraphs describe the upgrading strategy for enabling NetFlow and analyze the cost of different upgrading options according to different network locations with different traffic perspectives. The objective is to obtain a good insight of the entire network traffic. Although the analysis is based on a particular operator's network, the structure and router mix are representative of other operators' networks as well.

Generally, an operator's IP backbone network has a hierarchical structure and routers are categorized by their different locations and functions. In this example, three types of routers are present: Gateway (GW) routers, Backbone (BB) routers, and Shared Tenant (ST) routers. Gateway routers connect directly to customer routers and are used as local switches to exchange traffic between local customers and aggregate customer traffic that needs to traverse the network to backbone routers. Shared tenant routers represent exchange points for peering traffic with other Internet Service Providers (ISPs), such as AT&T, MCI, Sprint, etc. Backbone routers switch traffic between customer locations and peering ISPs. Some peering traffic comes directly to backbone routers as well. Gateway and backbone routers constitute the majority of this example network's routers. Similar architecture can be found for other IP backbone networks.

FIG. 1 illustrates an IP communication network architecture 100. A plurality of customer routers 110 connect to a gateway router 120 through a gateway-customer interface 111. Gateway router 120 connects to backbone router 130 through a gateway-backbone interface 121 to a backbone-gateway interface 122. Backbone router 130 connects to either another backbone router 140 or a shared-tenant router 150 through a backbone interface 131. Backbone router 140 or shared-tenant router 150 may connect to a plurality of peering routers 160 through a peering interface 141.

In measuring traffic within an IP network 100, there are five possible location types for deploying a network monitoring service. The five location types are gateway-customer interface 111, gateway-backbone interface 121, backbone-gateway interface 122, backbone interface 131, or backbone/shared-tenant interface 141.

In order to identify a set of routers where NetFlow might be enabled, the method examines cost and coverage characteristics for routers categorized based on their location in the network. With router configuration files collected from all routers in the example network and Cisco's listing prices, the capital investment required to cover 100% of network traffic at five different network locations is analyzed.

Each option is characterized by a different upgrade cost and captures different type of traffic, customer or peering. Options (a) through (c) allow the system to monitor only customer traffic while Option (e) covers only peering traffic. Option (d) gives insight to both customer and peering traffic. The cost to upgrade all routers in Options (a) through (e) are summarized with the pros and cons of each option in Table I.

Figure 2:
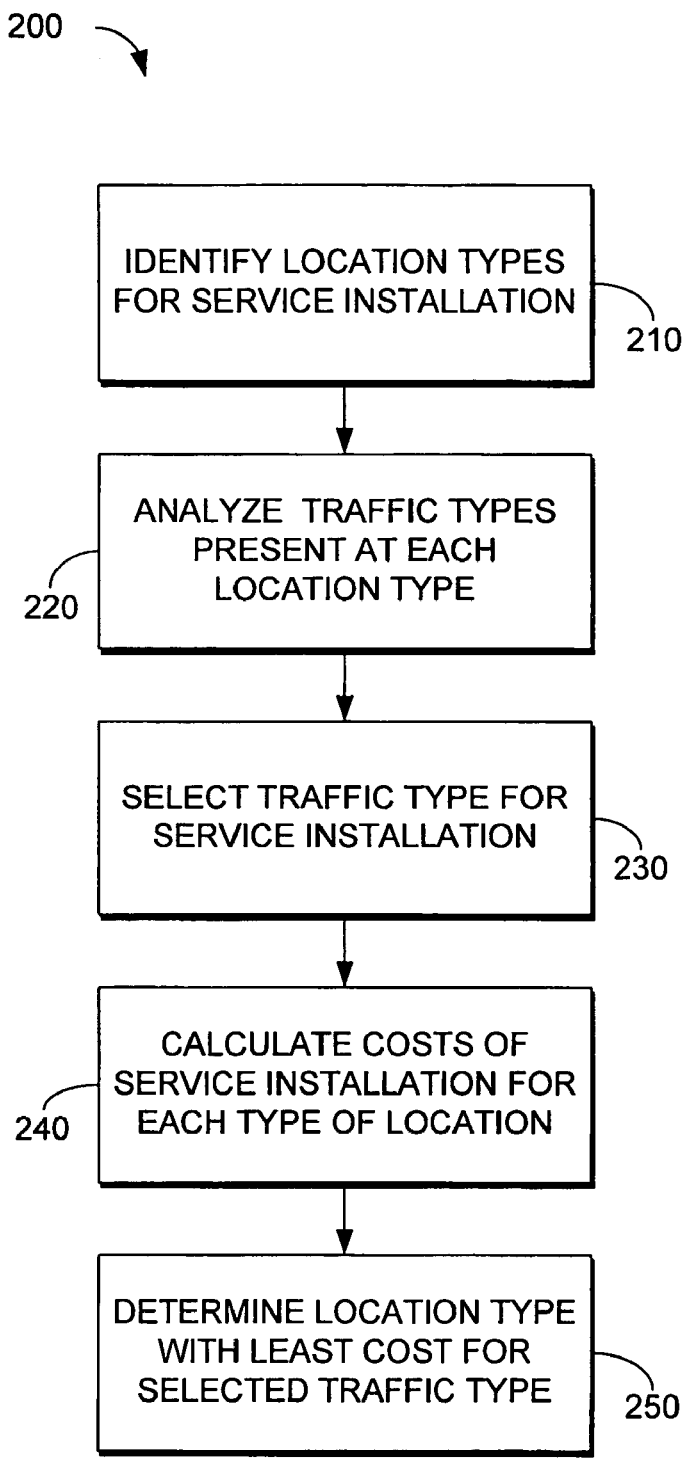
FIG. 2 illustrates a method in accordance with the present invention for determining locations at which to deploy a network monitoring service within a communication network.

Referring to FIG. 2, a method 200 for determining locations to deploy a network monitoring service within a communication network is illustrated in accordance with the present invention. Step 210 identifies location types for service installations. As illustrated in FIG. 1, location types refer to router interfaces with specific configurations carrying similar types of traffic. Step 220 analyzes the traffic types present at each identified location type. Step 230 selects a traffic type to monitor with the service to be installed. Step 240 calculates installing a service, NetFlow for example, for each identified location type for the selected traffic type. Step 250 determines the location type covering the selected traffic type with the least cost to install the service. One skilled in the art will appreciate that the various steps of method 200 may be performed in orders different from the order described herein and illustrated in FIG. 2.

In the analysis that follows, the network is configured with a mix of two major types of routers: routers of higher capacity but less flexibility and routers with more flexibility but lower capacity. The more flexible routers are usually manufactured with NetFlow support but not all of the high-capacity routers are manufactured with NetFlow support. Two families of Cisco routers may serve as examples: 12000 series (GSRs) and 7500 series. GSRs are high-capacity routers which can provide up to 40 Gbps/slot while 7500 series are usually of lower capacity than GSRs but provide more flexibility. This mix, which is a typical mix found in all major Tier-1 operators at this point, provides a network operator with a good combination of flexibility and capacity.

For both 12000 series and 7500 series, NetFlow can be enabled at interface level but the NetFlow-supporting capability is determined by the linecard and the router. A linecard is inserted into a vacant slot in a router. A linecard may contain one or more interfaces, which may also be referred to as ports. The following analysis summarizes the different factors in supporting NetFlow by the two router families and concludes that GSR series contributes to a major fraction of the upgrade cost.

TABLE I

| Option Label | Upgrade Location | Link Type | Normalized Cost | Characteristics | |
|---|---|---|---|---|---|
| | | | | Pros | Cons |
| (a) | GW | GW-customer | 1.48 | Able to cover locally-switched traffic | Some low-speed links cannot be upgraded |
| (b) | GW | GW-BB | 1 | Good customer traffic coverage with reasonable cost | Not able to cover locally-switched traffic |
| (c) | BB | BB-GW | 1.47 | | |
| (d) | BB | BB-BB or BB-ST | 5.1 | Covering most customer and peering traffic | Only covering traffic traversing through backbone links, most expensive |
| (e) | BB&ST | BB/ST-peer | 0.46 | Low cost, covering all peering traffic, a good supplement to Options (b) and (c) | Covering peering traffic only |

It is observed from Table I that since Option (b) has the best cost-coverage trade-off in covering customer traffic and Option (e) is more effective in covering peering traffic, combining (b) and (e) will produce a solution which provides a good insight into the network traffic. In other words, the best candidates to enable NetFlow is GW-BB links on GW routers and peering links on BB and ST routers. Although locally-switched traffic (i.e., traffic between customer routers connected to the same GW router) is not covered, the conclusion is that this type of traffic is a small percentage of the entire traffic. The cost is normalized to the one associated with Option (b) which represents the best location for covering customer traffic since it is the focus of this presentation. The remainder of this description presents how to cover a given fraction of customer traffic on gateway routers. The same methodology can be applied to peering traffic as well.

7500 series routers potentially support NetFlow. However, proper functioning of NetFlow is determined by the following factors: i) traffic load in terms of bits per second (bps) and packet per second (pps), ii) number of active flows, iii) RSP (Route Switch Processor, the central processor of the router) type and memory capacity, and iv) VIP (Versatile Interface Processors, the processor of a 7500 linecard) type and memory capacity. Therefore, the decision of whether or not a 7500 router or its linecards need an upgrade depends on both the router/linecard configuration and the traffic condition. The traffic load information can be obtained through Simple Network Management Protocol (SNMP). However, it is difficult to obtain the number of active flows without turning on NetFlow. Therefore, it is helpful to use packet traces that have been collected from several links in the network to identify the "typical" number of active flows going through a certain interface type on a 7500 series router. By testing the combination of traffic load, number of active flows, RSP type/memory, and VIP type/memory, the system can determine whether or not a certain router and linecard configuration supports NetFlow at a given network location.

For GSRs, the capability of supporting NetFlow is determined by the engine type. Some fully support NetFlow (Engine 3 and 4+), some do not support (Engine 4) and some support NetFlow with limitations (Engine 0, 1, and 2). These linecards either cannot support NetFlow with other desired features or have a performance limitation (e.g., low pps) which will be worsened when NetFlow is enabled. One may upgrade all non-supporting and supporting with limitation linecards to the fully-supporting ones. One important constraint is that during upgrade the interface speed must remain the same. As a consequence some linecards equipped with certain low-speed interfaces do not have any corresponding upgrading option. Therefore, whether a GSR linecard needs upgrade or not is solely based on its Engine type. Compared to 7500 routers, it is much easier to estimate the GSR upgrade costs.

Figure 3A:
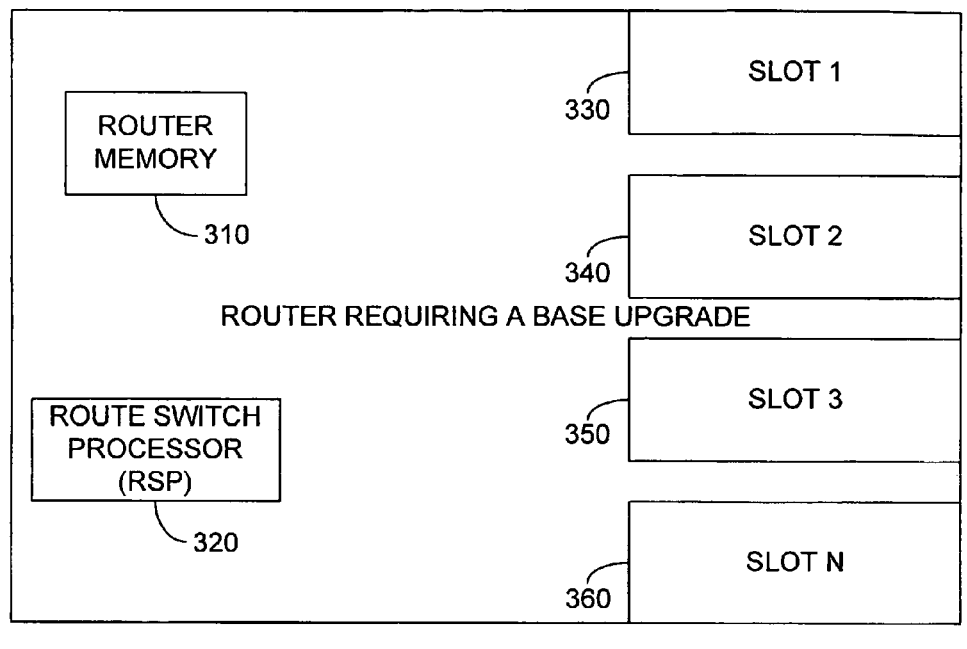
FIG. 3a and FIG. 3b illustrate a router requiring a base upgrade and its associated linecard in accordance with the present invention.
Figure 3B:
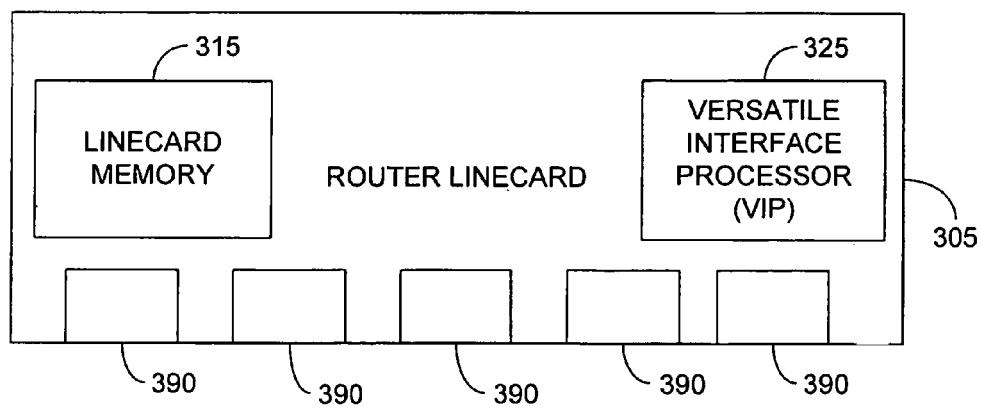

FIG. 3a illustrates a router 300 requiring a base upgrade. Router 300 is commonly known as a 'smart' router. A Cisco 7500 router is one example of a 'smart' router. Router 300 is comprised of router memory 310 and route switch processor (RSP) 320. Router 300 also has a plurality of slots illustrated as slot one 330, slot two 340, slot three 350 and slot N 360. Referring to FIG. 3b, a linecard 305 may be installed within slot one 330. Linecard 305 is comprised of linecard memory 315 and versatile interface processor (VIP) 325. Linecard 305 may have one or more interfaces 390. Each slot 330, 340, 350, and 360 may or may not have a linecard 305 installed.

Figure 4A:
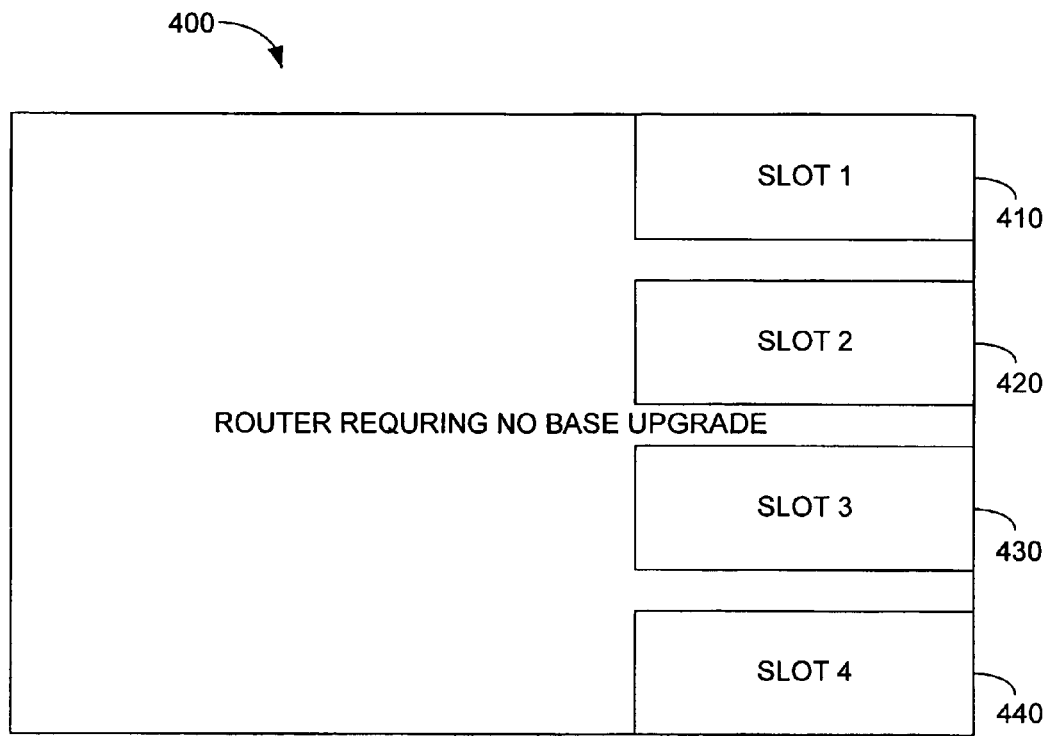
FIG. 4a and FIG. 4b illustrate a router requiring no base upgrade and its associated linecard in accordance with the present invention.
Figure 4B:
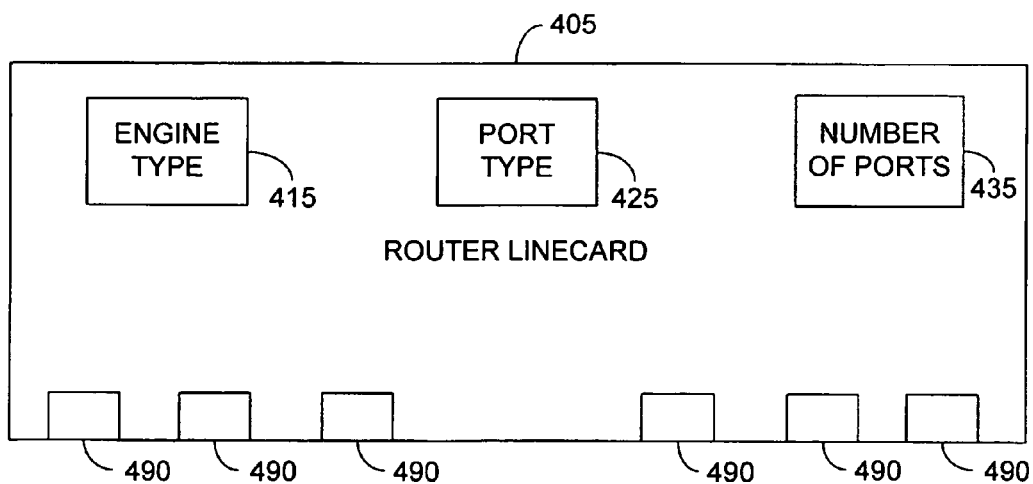

FIG. 4a illustrates a router 400 requiring no base upgrade. Router 400 is commonly known as a 'dumb' router. Cisco GSR router is one example of a 'dumb' router. Router 400 is comprised of four slots illustrated as slot one 410, slot two 420, slot three 430 and slot four 440. Referring to FIG. 4b, a linecard 405 may be installed within slot one 410. Linecard 405 may have one or more interfaces 490. Linecard 405 has properties, such as engine type 415, port type 425, and number of ports 435. Each slot 410, 420, 430, and 440 may or may not have a linecard 405 installed.

Figure 5:
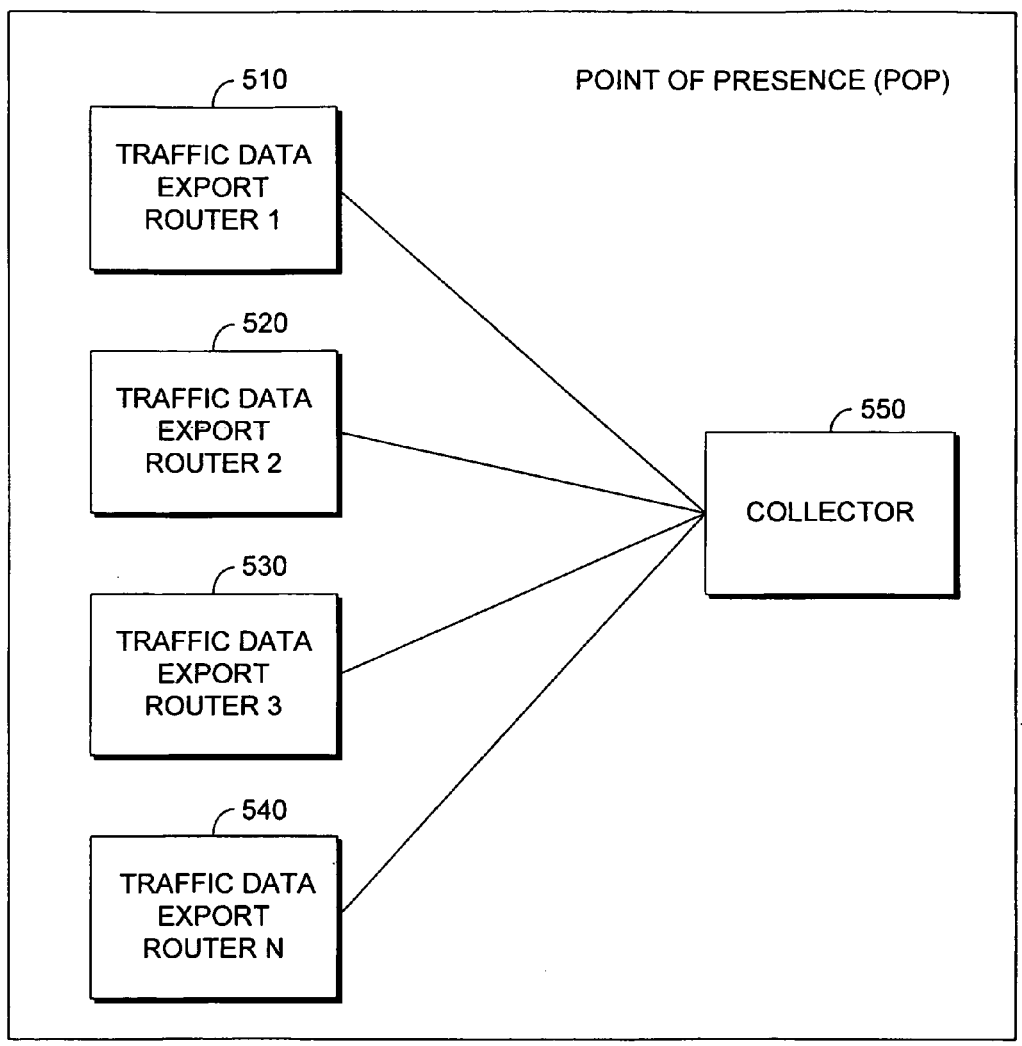
FIG. 5 illustrates an implementation of network traffic management components within a point of presence in accordance with the present invention.

Referring now to FIG. 5, an implementation of traffic management components within a point of presence 500 is illustrated in accordance with the present invention. Cisco NetFlow is an example of a traffic management system which is implemented in this manner. A point of presence (PoP) is a physical location containing a plurality of routers. A plurality of routers 510, 520, 530 and 540 have traffic data export component installed. Cisco NetFlow Data Export is an example of a traffic data export component. Each traffic data export installation on routers 510, 520, 530 or 540 connects to a collector 550. A NetFlow Collector is an example of collector 550.

One specific example using Cisco routers is described mathematically below. While the notation is specific to the Cisco example, the present invention can be applied to other network services deployed to network elements regardless of the manufacturer(s) of the network elements.

Let $\mathcal{G}_{7500}$ and $\mathcal{G}_{GSR}$ be the set of all 7500 and GSR gateway routers, respectively. Let $\mathcal{P}$ be the set of all PoPs in the network and $\mathcal{P}_i$ represent the set of routers belonging to PoP i. A router is present in one and only one PoP.

For 7500 Gateway routers, let R(g) be the set of available router-configurations in the form of ⟨RSP type, memory size⟩ pairs for each gateway router $g \in \mathcal{G}_{7500}$, while $\mathcal{S}(g)$ be the set of slots on router g, whose cardinality is denoted by $|\mathcal{S}(g)|$.

Let c(g) be the minimal cost to upgrade the current configuration of router g to one that supports NetFlow. c(g)=0 if the current one supports NetFlow. Let r(g)=1 denote if such an upgrade is available, and r(g)=0 otherwise. Let c(g,s) be the minimal cost to upgrade the current ⟨VIP, memory⟩ configuration at slot s, router g to one that supports NetFlow. c(g,s)=0 if the current configuration supports NetFlow. Let r(g,s)=1 denote if such an upgrade is available, and r(g,s)=0 otherwise. Let $d_{(g,s)}$ be the traffic processed at slot s on router g.

For GSR Gateway routers, let $\mathcal{S}(g)$ be the set of slots for router $g \in \mathcal{G}_{GSR}$. Each slot has one and only one linecard which can be represented as a ⟨Engine Type, Port Type, Number of Ports⟩ triple. Let $\mathcal{T}$ be the set of all linecard types present on the routers in $\mathcal{G}_{GSR}$. For each $g \in \mathcal{G}_{GSR}$ we define $\mathcal{T}(g)$ as the set of linecards present on router g. Each linecard $t \in \mathcal{T}$ may or may not be upgraded to another linecard version that supports NetFlow. Let r(t) be a binary parameter which equals to 1 if linecard t can be upgraded to a new version supporting NetFlow and 0 otherwise. Let c(t) represent the cost to upgrade if r(t)=1. For each router $g \in \mathcal{G}_{GSR}$ and for each $t \in \mathcal{T}(g)$ we define $v_g(t)$ as the set of slot-indices where linecard t is present. Let $p_{g,s}(t)$ represent the number of used ports of linecard $t \in \mathcal{T}(g)$ in slot s on router g in the current configuration. Let $a_g(t)$ denote the number of available ports in the upgraded version of linecard $t \in \mathcal{T}$.

For Collectors, let C represent the cost of a single collector. Let N be the maximum number of routers that can be supported by a single collector. According to Cisco documentation, N=5 and varies with traffic and the NetFlow sampling rate. In this presentation, N is assumed to be constant since there is no public documentation on how N varies. The model can be easily extended to incorporate different constraints on N.

The minimum acceptable traffic coverage, D ($0 \leq D \leq 1$), is defined as the minimum fraction of customer traffic that needs to be covered by NetFlow.

The following decision variables are to be solved:

Binary variable $\eta(g,s)$ for $g \in \mathcal{G}_{GSR} \cup \mathcal{G}_{7500}$, $s \in \mathcal{S}(g)$ equals to 1 if slot s in router g runs NetFlow, and 0 otherwise.

Binary variable $\gamma(g)$ for $\forall g \in \mathcal{G}_{GSR} \cup \mathcal{G}_{7500}$ equals to 1 if router g runs NetFlow, and 0 otherwise.

Integer variable $v_g(t)$ describes the number of linecards of type $t \in \mathcal{T}(g)$ on router $g \in \mathcal{G}_{GSR}$ that need to be upgraded to run NetFlow.

Integer variable $NC_i$ is the number of collectors needed to cover all the routers in $PoP_i$ that have NetFlow enabled.

The objective of the ONLP problem is to minimize the total upgrade cost expressed by $$F = F_{7500} + F_{GSR} + F_{Col},$$

where $$F_{7500} = \sum_{g \in G_{7500}} \left( c(g)\gamma(g) + \sum_{s \in S(g)} c(g,s)\eta(g,s) \right)$$

$$F_{GSR} = \sum_{g \in \mathcal{G}_{GSR}} \sum_{t \in \mathcal{T}(g)} v_g(t) c(t)$$

$$F_{Col} = \sum_{i \in \mathcal{P}} NC_i \times C$$

Constraints may be defined for each type of element. For 7500 Gateway routers the relationship between variables γ and η may be defined as:

$$\gamma(g) \le \sum_{s \in \mathcal{S}(g)} \eta(g, s) \; \forall g \in \mathcal{G}_{7500}$$

$$\gamma(g)|\mathcal{S}(g)| \ge \sum_{s \in \mathcal{S}(g)} \eta(g, s) \; \forall g \in \mathcal{G}_{7500}$$

The constraints above link the variables γ associated to each router with variables η associated to each slot. The first constraint forces γ (g) to be equal to 0 if none of its slots has been selected to run NetFlow. In this case, there is no necessity to upgrade the configuration of the router (RSP type, memory size) and γ(g)=0. On the other hand, the second constraint forces γ(g) to be equal to 1 if one or more of its slots have been selected to run NetFlow. In this case the (RSP type, memory size) of the router may require an upgrade.

The relationship between r(g) and γ(g), and r(g,s) and η(g, s) may be defined as:

$$r(g) \ge \gamma(g) \forall g \in \mathcal{G}_{7500}$$

$$r(g,s) \ge \eta(g,s) \ge \eta(g,s) \forall g \in \mathcal{G}_{7500}, \forall s \in \mathcal{S}(g)$$

The constraints above guarantee that a router/slot can be selected to have NetFlow enabled only if its current configuration supports NetFlow or it can be upgraded to another configuration that supports NetFlow.

For GSR Gateway routers the relationship between r(g,s) and η(g,s) may be defined as:

$$\eta(g,s) \le r(g,s) \forall g \in \mathcal{G}_{GSR}, \forall s \in \mathcal{S}(g)$$

The above constraint ensures that slot s on router g will be considered as a candidate for enabling NetFlow only if there exists an upgrade that can support NetFlow.

The number of interfaces may be defined as:

$$a_g(t)v_g(t) \ge \sum_{s \in V_g(t)} \eta(g, s) p_{g,s}(t)$$

$$\forall g \in \mathcal{G}_{GSR}, \forall t \in \mathcal{T}(g)$$

The above constraint guarantees that an adequate number of linecards of a certain (Engine type, Port type, Number of ports) are purchased. For example, if router g has two linecards of type t with one port being used on each, and the upgraded version of linecard type t has four ports available, then the above constraint implies that only one upgraded version of linecard type t is necessary, i.e. $v_g(t) \ge 1$. When the total cost is minimized by the objective function, $v_g(t)$ will be forced to be equal to 1 and the minimum number linecards necessary may be determined.

There are also constraints that are common to both GSR and 7500 Gateway Routers. For both router types, the fraction of customer traffic to be covered by enabling NetFlow on specific routers and slots may be defined as:

$$\sum_{g \in \mathcal{G}_{7500}} \sum_{s \in \mathcal{S}(g)} d_{(g,s)} \eta(g, s) + \sum_{g \in \mathcal{G}_{GSR}} \sum_{s \in \mathcal{S}(g)} d_{(g,s)} \eta(g, s) \ge$$

$$D \left( \sum_{g \in \mathcal{G}_{7500}} \sum_{s \in \mathcal{S}(g)} d_{(g,s)} + \sum_{g \in \mathcal{G}_{GSR}} \sum_{s \in \mathcal{S}(g)} d_{(g,s)} \right)$$

The above constraint ensures that the final solution selected must cover at least a D fraction of customer traffic. It is clear that the larger D is, the larger the number of slots enabled to support NetFlow and the associated deployment cost will be.

For both router types, the number of collectors needed per PoP:

$$N \times NC_i \ge \sum_{g \in \mathcal{P}_i} \gamma(g) \; \forall i \in \mathcal{P}$$

$$NC_i \le \sum_{g \in \mathcal{P}_i} \gamma(g) \; \forall i \in \mathcal{P}$$

The above constraints ensure that for any PoP, if there are routers with NetFlow enabled, the number of collectors in this PoP will be sufficient to cover all these routers, given that the maximum routers per connector is fixed. At the same time, no connectors should be placed at any given PoP where no router is enabled with NetFlow. The objective function will force the number of collectors per PoP to be minimum.

Figure 6:
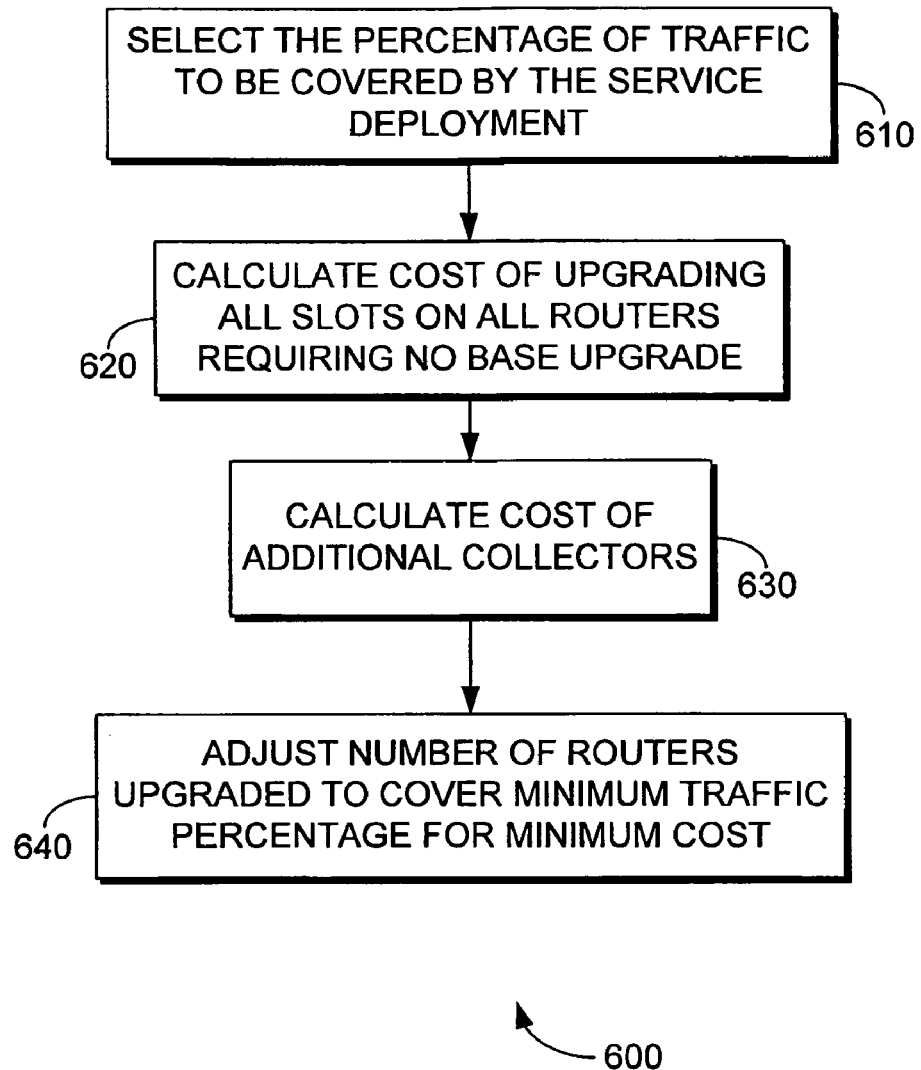
FIG. 6 illustrates a method in accordance with the present invention for determining on which network devices to deploy a network monitoring service within a communication network.

In FIG. 6, a method 600 for determining network equipment to deploy a network monitoring service within a communication network is illustrated in accordance with the present invention. Step 610 selects the percentage of traffic to be covered by the service deployment. This percentage may be expressed as a number between 0 and 1. Often, the percentage of traffic to be covered may be determined by the service provider. Step 620 calculates the cost of upgrading all slots on all routers requiring no base upgrade. Step 630 calculates the cost of additional collectors. Step 640 adjusts the number of routers upgraded to cover the minimum traffic percentage, as selected in step 610, for the minimum cost.

Figure 7:
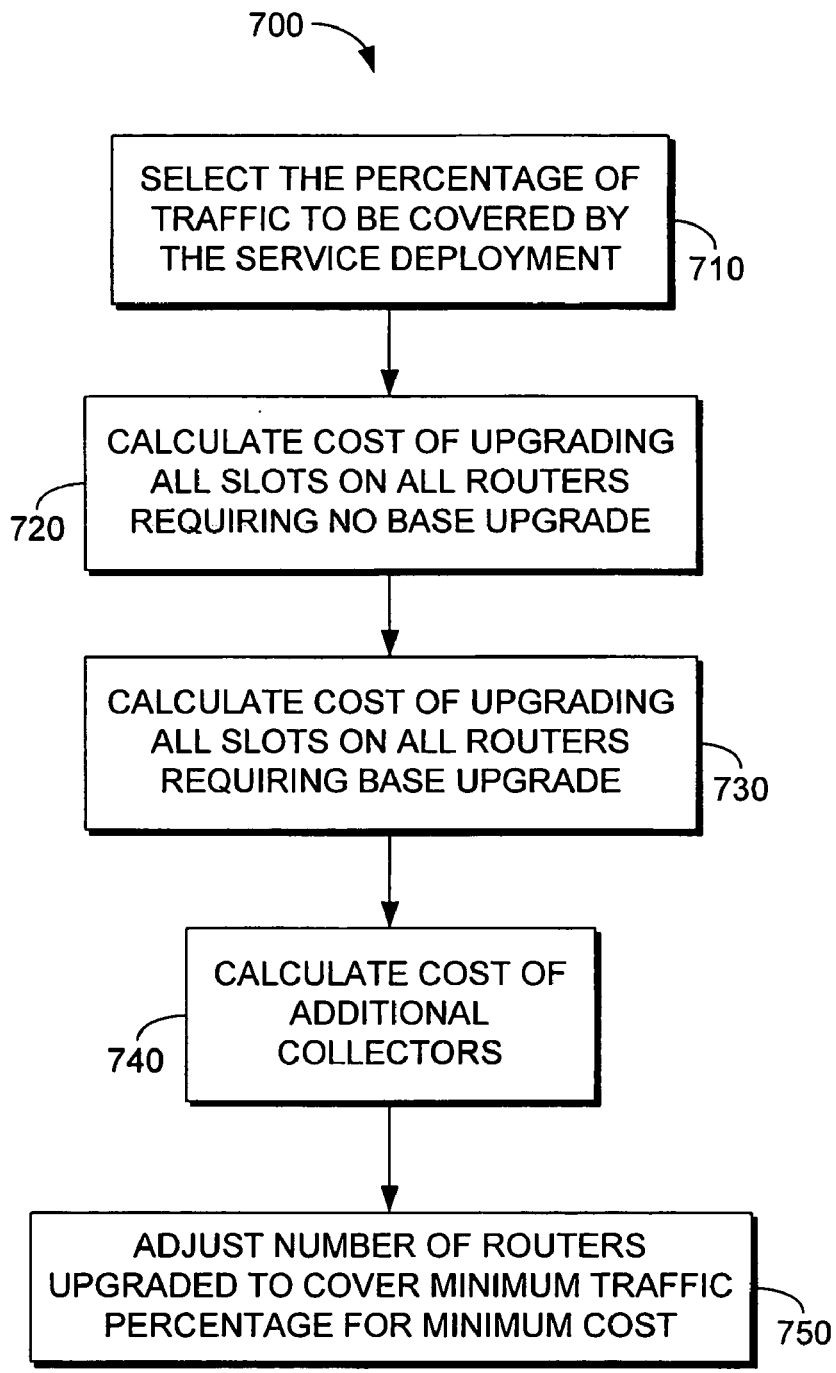
FIG. 7 illustrates a further method in accordance with the present invention for determining on which network devices to deploy a network monitoring service within a communication network.

In FIG. 7, a method 700 for determining network equipment to deploy a network monitoring service within a communication network is illustrated in accordance with the present invention. Step 710 selects the percentage of traffic to be covered by the service deployment. Often, the percentage of traffic to be covered may be determined by the service provider. This percentage may be expressed as a number between 0 and 1. Step 720 calculates the cost of upgrading all routers requiring no base upgrade. Step 730 calculates the cost of all routers requiring a base upgrade. Step 740 calculates the cost of additional collectors. Step 750 adjusts the number of routers upgraded to cover the minimum traffic percentage, as selected in step 710, for the minimum cost.

The following analysis proves that ONLP is NP-hard. First, to prove the following decision ("true/false") version of NetFlow Location Problem reduces to ONLP:

Given traffic T and cost C, is it possible to upgrade the network with cost no more than C and cover at least traffic T?

If the ONLP problem to cover traffic T is solved and obtains the optimal cost C*, for any cost C≥C*, the answer is "true" and for C<C*, the answer is "false".

Name the decision version of NetFlow Location Problem DNLP. Then prove DNLP is NP-hard by reducing the Knapsack problem to it.

A formal statement of the Knapsack problem is as follows. A finite set U, a size $s(u) \in Z^+$ and a value $v(u) \in Z^+$ for each $u \in U$, a size constraint $B \in Z^+$, and a value goal $K \in Z^+$. The question to be resolved, then becomes: Is there a subset $U' \subseteq U$ such that $$\sum_{u \in U'} s(u) \le B$$

and $$\sum_{u \in U'} v(u) \ge K ?$$

DNLP problem may be restricted to the case that the cost of a collector is zero, the cost of a 7500 RSP is zero, and there is no GSR in the network. Then focus on 7500 router slots since they are the sole source of upgrade cost. For each slot, there is traffic t and upgrade cost c associated. There is a one-to-one mapping from Knapsack to DNLP. For each $u \in U$ with size $s(u)$ and value $v(u)$, construct a router slot s with traffic $t = v(u)$ and cost $c = s(u)$. With the one-to-one mapping, it is obvious that Knapsack is solvable if and only if this restricted version of DNLP problem is solvable. Therefore, the optimization version, ONLP, is NP-hard. Moreover, DNLP is NP-complete since it is obvious that DNLP∈NP. Given C and T, a non-deterministic algorithm can guess a solution and it can be checked within polynomial time whether the solution covers at least traffic T and costs at most C. Since ONLP is NP-hard, there exist problem instances which are not likely to be solved within a reasonable amount of time. For example, size of the network studied, changes in the network traffic distribution, changes in the pricing of the upgrade options, are crucial factors for which may present problems in solving the Integer Linear Programming (ILP) model to optimality.

Figure 8:
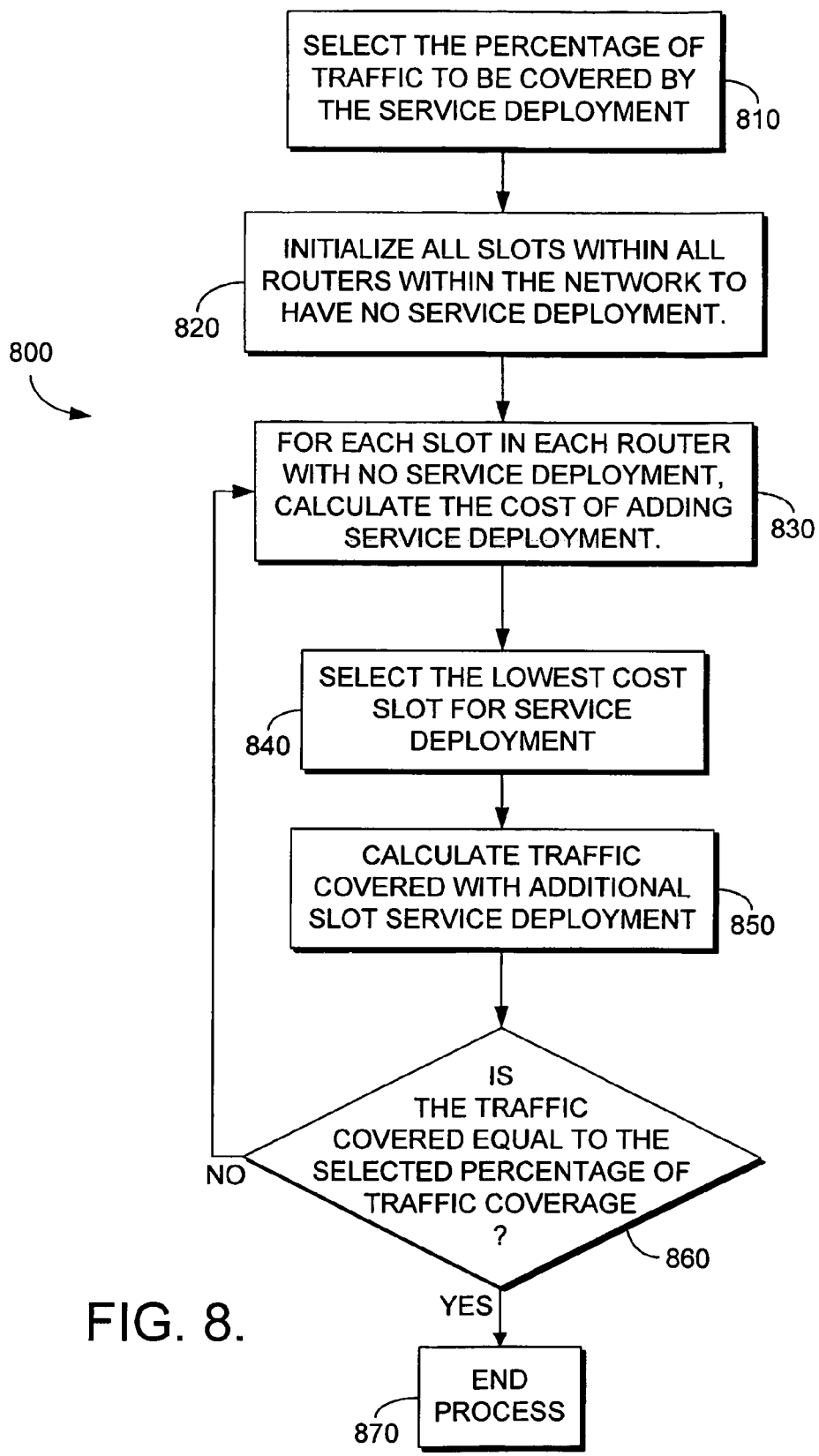
FIG. 8 illustrates a method in accordance with the present invention for determining on which network devices to deploy a network monitoring service within a communication network using a heuristic.

Referring to FIG. 8, a method 800 for determining on which network equipment to deploy a network monitoring service within a communication network is illustrated in accordance with the present invention. Step 810 selects the percentage of traffic to be covered by the service deployment. Often, the percentage of traffic to be covered may be determined by the service provider. This percentage may be expressed as a number between 0 and 1. Step 820 initializes all slots within all routers within the communication network to have no service deployment. This operation effectively starts the deployment with a 'clean slate'. Step 830 calculates the cost of deploying the network monitoring service for each slot within each router that does not currently have the service deployed. Step 830 may further calculate the cost of deploying the network monitoring service prorated (or "amortized") over the volume of traffic expected over the slot. Step 840 selects the slot with the lowest calculated cost for service deployment. The lower cost slot selected by step 840 may be selected based upon absolute or prorated costs. Step 850 calculates the traffic that is covered including the newly deployed slot. Step 860 checks if the traffic covered that was calculated in step 850 is equal to or greater than the percentage of traffic selected in step 810. If the traffic covered is equal to or greater than the selected percentage, the method ends with step 870. If the traffic covered is less than the selected percentage, the method proceeds to step 830.

Figure 9:
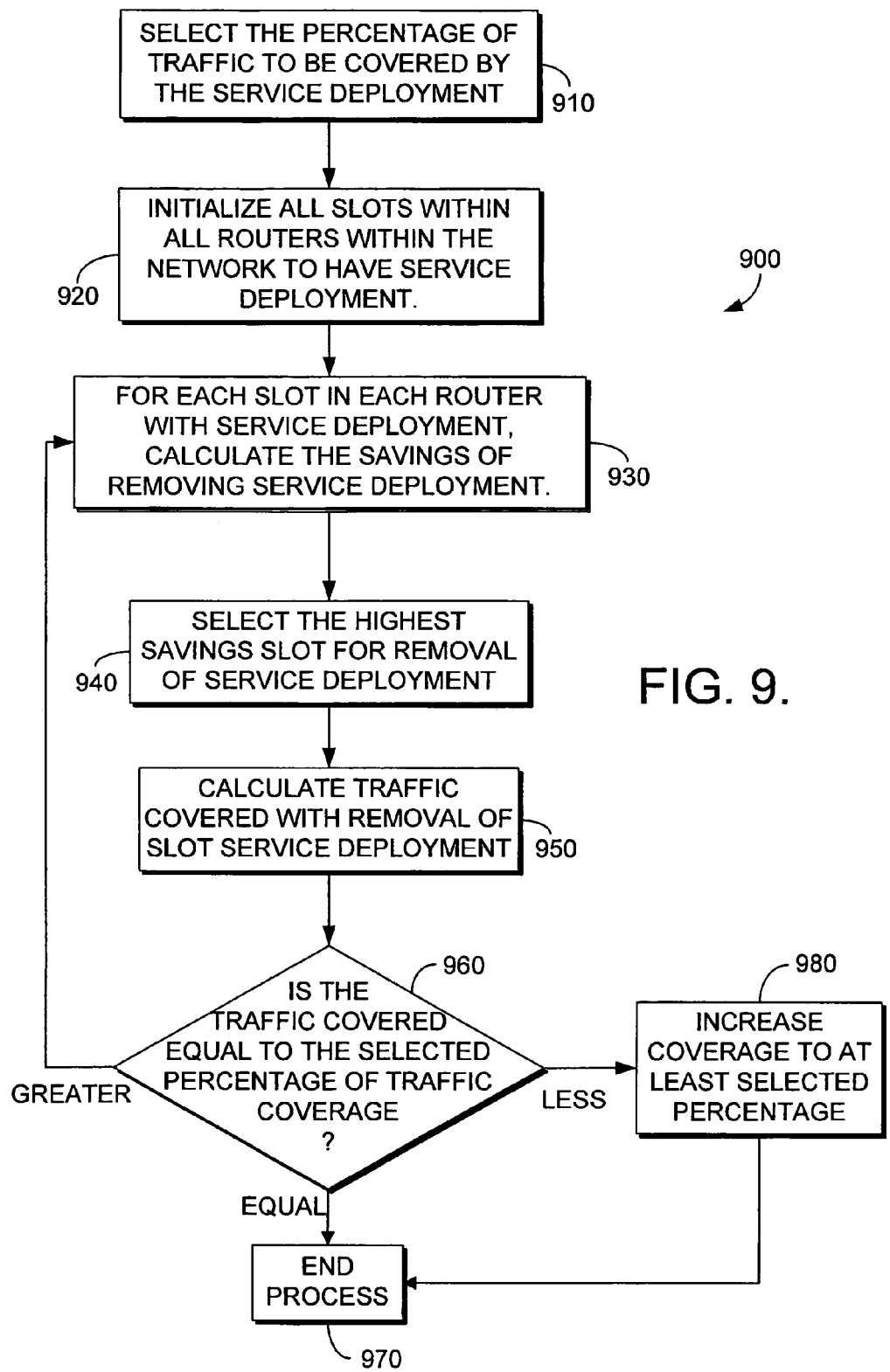
FIG. 9 illustrates a further method in accordance with the present invention for determining on which network devices to deploy a network monitoring service within a communication network using a heuristic.

Referring to FIG. 9, a method 900 for determining on which network equipment to deploy a network monitoring service within a communication network is illustrated in accordance with the present invention. Step 910 selects the percentage of traffic to be covered by the service deployment. This percentage may be expressed as a number between 0 and 1. Often, the percentage of traffic to be covered may be determined by the service provider. Step 920 initializes all slots within all routers within the communication network to have the network monitoring service deployment. This operation effectively starts the deployment with a fully deployed network. Step 930 calculates the savings of removing the network monitoring service for each slot within each router that currently has the service deployed. Step 930 may further calculate the savings of removing the network monitoring service prorated (or "amortized") over the volume of traffic expected over the slot. Step 940 selects the slot with the highest calculated savings to remove the service deployment. The highest savings slot selected by step 940 may be selected based upon absolute or prorated savings. Step 950 calculates the traffic that is covered after removing the deployment from the selected slot. Step 960 checks if the traffic covered that was calculated in step 950 is equal to or greater than the percentage of traffic selected in step 910. If the traffic covered is equal to the selected percentage, method 900 ends with step 970. If the traffic covered is greater than the selected percentage, method 900 proceeds to step 930. If the traffic covered is less than the selected percentage, method 900 proceeds to step 980 to increase coverage to at least the selected percentage. Step 980 may comprise simply restoring coverage to the last slot selected in step 940. Alternatively, step 980 may comprise method 800 to add slots until sufficient coverage is obtained.

Figure 10:
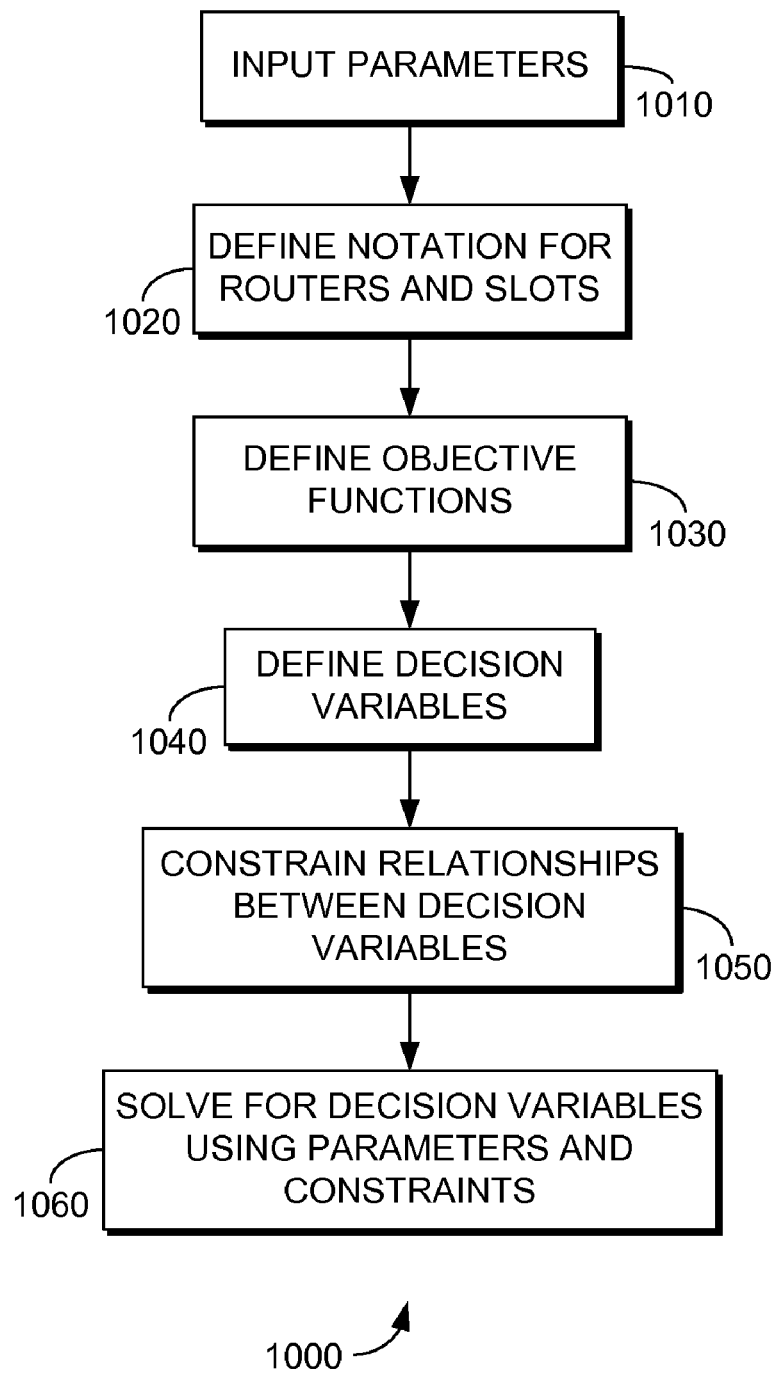
FIG. 10 illustrates a method in accordance with the present invention for determining on which network devices to deploy a network monitoring service within a communication network.

Referring now to FIG. 10, a method 1000 in accordance with the present invention is illustrated. Method 1000 may be considered in use with system 1100 illustrated in FIG. 11. Method 1000 and system 1100 may operate in accordance with the present invention, including other methods described herein, to determine a cost effective network monitoring configuration. In step 1010 parameters may be input into system 1100. Parameter component 1110 of system 1100 may receive parameters in step 1010. In step 1020, notation for routers in slots may be defined. In step 1030 objective functions for use in minimizing network monitoring costs may be defined. In step 1040 decision variables for use in minimizing network monitoring costs may be defined. Step 1020, step 1030, and step 1040 may occur within solver component 1130 of system 1100. In step 1050 relationships between decision variables may be constrained. Stem 1050 may be entered through constraint component 1120 of system 1100. In step 1060 the decision variables may be solved to minimize network monitoring costs using the parameters input in step 1010 and the constraints entered in step 1050. Step 1060 may occur in solver component 1130 of system 1100.

Figure 11:
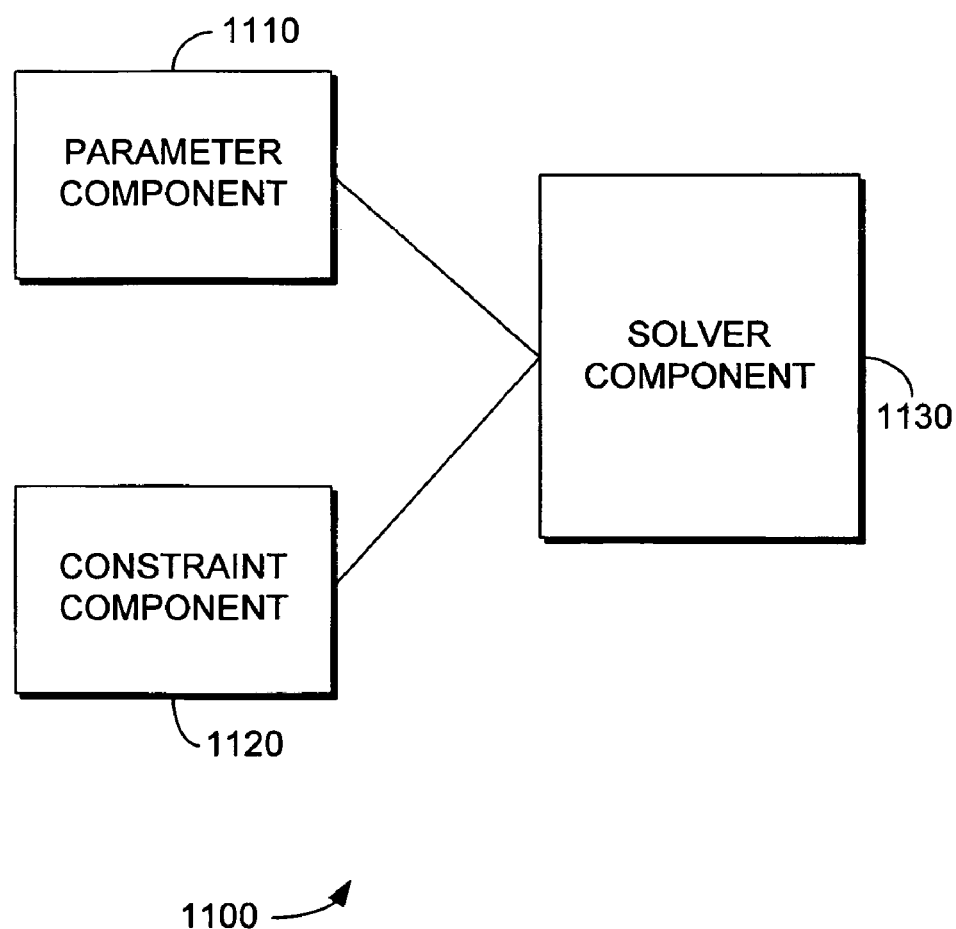
FIG. 11 illustrates a system for determining on which network devices to deploy a network monitoring service within a communication network.

Referring further to FIG. 11, system 1100 may appropriately comprise computer software operating upon any computing system and written in any computer programming language. The parameter component 1110, constraint component 1120, and solver component 1130 illustrated in FIG. 11 may be structurally distinct program components or may be integral. Further, one skilled in the art will appreciate that additional components to system 1100 may be implemented without departing from the spirit and scope of the present invention.

Specific Cisco examples of the heuristics described above follow. One skilled in the art will note that given the current CPU utilization on 7500 RSPs, there is no need to upgrade to a higher RSP version and thus no related cost, but this will not necessarily be the case for all circumstances. Hence, only three types of cost are considered in the heuristics associated respectively with collectors, GSR linecard upgrade, and 7500 linecard upgrade. The heuristics can be easily extended if 7500 RSP cost were to be included.

The input and output of the two heuristics are the same as those of the ILP model. Recall that $d_{(g,s)}$ is the traffic going through slot s on router g. In addition, the following notations and variables are used in the heuristics:

$T_{total}$, the total traffic under consideration. The target is to cover $D \times T_{total}$ by NetFlow.

$T_{covered}$, the variable representing the traffic that is covered by NetFlow.

$c_{(g,s)}$, the cost to upgrade slot s on router g to support NetFlow. This data is obtained by processing upgrade options and CPU and memory required.

$C_{total}$, the variable representing the total cost of deployment which is the objective in the ILP.

To make the current discussion more concise, it shall be assumed that all linecards are upgradeable to support Net-Flow. One skilled in the art will appreciate that heuristics can be easily generalized to cover the other case.

The first heuristic is called Max-Plus (MP) and a formal specification is described as Algorithm One. In MP, Algorithm One begins with a network with no NetFlow and adds NetFlow-enabled router slots until the required traffic coverage is met. Collectors are added as needed. The admissibility of a slot is based on traffic flowing through the slot and the associated cost for enabling NetFlow, including the necessary collector deployment as well. After each selection, the slot with the currently largest traffic to cost ratio will be added as NetFlow-enabled.

Algorithm One–Max-Plus (MP) begins by initializing $T_{covered}=0$, and $C_{total}=0$, and $T_{remaining}=T_{total} \times D - T_{covered}$ The second step is to examine all slots without NetFlow enabled. For each slot s on router g at PoP p, the additional collector cost at PoP p if slot s were to be selected to enable NetFlow is calculated. Let $C_{collector}(g,s)$ be the cost to deploy additional collectors at PoP p shall NetFlow be enabled at this slot.

$$C_{collector}(g, s) = \begin{cases} 0 & \text{if router } g \text{ has NetFlow on or} \\ & \text{if collectors at PoP } p \text{ can support} \\ & \text{one more router} \\ C & \text{otherwise} \end{cases}$$

$$CostPerBit(g, s) = \frac{c_{(g,s)} + C_{collector}(g, s)}{\text{Min}(d_{(g,s)}, T_{remaining})}$$

The third step is to enable NetFlow on slot s at router g with the smallest CostPerBit(g,s). To do this, one may set $T_{covered}=T_{covered}+d_{(g,s)}$, and $C_{total}=C_{total}+c_{(g,s)}+C_{collector}(g,s)$.

An update $T_{remaining}$ may then be calculated

The second and third steps may then be repeated until $T_{remaining} \leq 0$

The second heuristic, called Least-Minus (LM) approaches the problem from the opposite direction and a formal specification can be found in Algorithm Two. In LM, start with a network with full NetFlow coverage and keep removing NetFlow-enabled router slots and collectors until the traffic coverage is below the required threshold. A similar selection process as that in Algorithm 1 is then used to add just enough number of router slots to meet the coverage requirement. The admissibility of a slot for NetFlow removal is also based on traffic associated and the cost for enabling NetFlow on this slot, including both the upgrade cost and a proportional share of the collector cost at the PoP. After each selection, the slot with the currently lowest traffic to cost ratio will be removed.

Algorithm Two—Least-Minus (LM) begins with a first step by, for each slot s on router g at PoP p, enabling NetFlow. Values may be defined such that:

$$T_{covered} = \sum_g \sum_{s \in S(g)} d_{(g,s)}$$

$$C_{total} = \sum_g \sum_{s \in S(g)} c_{(g,s)} + \sum_p NC(p) \times C$$

$$T_{extra} = T_{covered} - T_{total} \times D$$

All slots with NetFlow enabled may then be examined. For each slot s on router g at PoP p, calculate $C_{collector}(g,s)$ as how much it is responsible for the collector cost at PoP p. Let $N_r(p)$ denote the number of routers with NetFlow enabled at PoP p and $N_s(g)$ denote the number of slots with NetFlow enabled at router g. Then, $$C_{collector}(g, s) = \frac{NC(p) \times C}{N_r(p) \times N_s(g)}$$

$$CostPerBit(g, s) = \frac{c_{(g,s)} + C_{collector}(g, s)}{d_{(g,s)}}$$

As the third step, a slot with the largest CostPerBit(g,s) may be identified and NetFlow removed from this slot. The number of collectors at the PoP may be updated if necessary. Updated $C_{total}$ and $T_{extra}$ may then be calculated.

The second and third steps may then be repeated until $T_{extra} \leq 0$. If $T_{extra} < 0$, Algorithm One may be used to pick a slot to enable NetFlow. $C_{total}$ and $T_{extra}$ may be updated alter each slot is enabled until $T_{extra} \geq 0$. Alternatively, the last slot that was removed may be restored.

One skilled in the art will appreciate that the present invention may be used in conjunction with the deployment of any network service. While embodiments of the present invention for NetFlow monitoring and Cisco routers are described, the present invention may be used with any network monitoring system and with any type of router or other network device.

The invention claimed is:

1. A method for determining on which routers to deploy a network monitoring service within a communication network for the lowest cost for a selected percentage of a type of overall traffic coverage across the communication network, the method comprising:
   (a) selecting a percentage of the type of overall traffic across the communication network to be covered by the network monitoring service;
   (b) initializing all slots within a set of routers by which targeted traffic is switched independent within all points of presence (Pops) within the communication network to have no network monitoring service deployed;
   (c) calculating prorated costs of adding the network monitoring service to each slot within each router that does not have the network monitoring service deployed for each option of monitoring customer traffic only, monitoring peering traffic only, and monitoring both customer and peering traffic;
   d) normalizing the calculated prorated costs based on an optimum location for covering consumer traffic, wherein the optimum location comprises one of a gateway-customer interface, a gateway-backbone interface, a backbone-gateway interface, a backbone interface, or a backbone/shared-tenant interface;
e) comparing the normalized calculated prorated costs of each slot within each router that does not have the network monitoring service;
f) selecting a first slot on a first router with a lowest normalized calculated prorated cost to deploy the network monitoring service;
g) calculating the percentage of the type of overall traffic across the communication network deploying the network monitoring service to the selected first slot on the first router; and
h) continuing steps (c) through (g) until the percentage of the type of overall traffic across the communication network covered is greater than or equal to the selected percentage of the type of overall traffic coverage across the communication network.

2. The method of claim 1, further comprising calculating the cost of adding the network monitoring service for each slot within each router that does not have the network monitoring service deployed including a cost of an additional collector at the point of presence, if required.

3. A method for determining on which routers to deploy a network monitoring service within a communication network for the lowest cost for a selected percentage of a type of overall traffic coverage across a network, the method comprising:
(a) selecting a percentage of a type of overall traffic across a network to be covered by the network monitoring service;
(b) initializing all slots within a set of routers by which targeted traffic is switched independent within all points of presence (Pops) within the communication network to have network monitoring service deployed;
(c) identifying a location type of each deployed network monitor service;
(d) calculating absolute prorated savings of removing the network monitoring service from each slot within each router that has the network monitoring service deployed based upon the location type and the type of overall traffic for each option of monitoring customer traffic only, monitoring peering traffic only, and monitoring both customer and peering traffic;
(e) normalizing the calculated absolute savings based on an optimum location for covering consumer traffic, wherein the optimum location comprises one of a gateway-customer interface, a gateway-backbone interface, a backbone-gateway interface, a backbone interface, or a backbone/shared-tenant interface;
(f) comparing the absolute calculated savings of removing the network monitoring service from each slot within each router that has the network monitoring service deployed;
(g) selecting a first slot on a first router with a highest absolute calculated savings to remove the network monitoring service;
(h) calculating a percentage of the type of overall traffic covered across the communication network by the network monitoring service after removing the network monitoring service from the selected first slot on the first router; and
(i) continuing steps (c) through (f) until the percentage of the type of overall traffic covered across the communication network is less than or equal to the selected percentage of overall traffic coverage across the communication network.

4. The method of claim 3 further comprising calculating the savings of removing the network monitoring service for each slot within each router that has the network monitoring service deployed including a savings of removing a collector at the point of presence, if possible.

5. A system for determining on which routers to deploy a network monitoring service within a communication network for the lowest cost for a selected minimum percentage of a type of overall traffic coverage across the communication network, the system comprising:
a parameter component executing computer software operating upon a computer system to collect and store values for parameters comprising the minimum percentage of the type of overall traffic coverage across the communication network, upgrade options for each type of router, a cost of each upgrade option, a cost of a collector; and
a solver component executing computer software operating upon a computer system which performs the following steps:
(a) initializing all slots within a set of routers by which targeted traffic is switched independent within all points of presence (Pops) within the communication network to have no network monitoring service deployed;
(b) calculating prorated costs of adding the network monitoring service for each slot within each router that does not have the network monitoring service deployed based upon a location type and a type of overall traffic for each option of monitoring customer traffic only, monitoring peering traffic only, and monitoring both customer and peering traffic;
(c) normalizing the calculated prorated costs based on an optimum combination of the location type and the type of overall traffic for covering consumer traffic, wherein the optimum location comprises one of a gateway-customer interface, a gateway-backbone interface, a backbone-gateway interface, a backbone interface, or a backbone/shared-tenant interface;
d) comparing the normalized calculated prorated costs of each slot within each router that does not have the network monitoring service;
e) selecting a first slot on a first router with a lowest normalized calculated prorated cost to deploy the network monitoring service;
f) calculating a percentage of the type of overall traffic covered across the communication network by the network monitoring service after deploying the network monitoring service to the selected first slot on the first router; and
g) continuing steps (b) through (f) until the percentage of the type of overall traffic covered across the communication network is greater than or equal to the selected percentage of the type of overall traffic coverage across the communication network.

6. The system of claim 5, wherein the solver component performs the additional step of selecting a second slot with the most traffic in the case where multiple slots have the same calculated cost.

7. The system of claim 5, further comprising a constraint component to store constraints comprising: a maximum number of routers that can be supported by a collector.

8. A system for determining on which routers to deploy a network monitoring service within a communication network for the lowest cost for a selected minimum percentage of a type of overall traffic coverage across the communication network, the system comprising:

a parameter component executing computer software operating upon a computing system to collect and store values for parameters comprising a maximum percentage of the type of overall traffic coverage across the communication network, upgrade options for each type of router, a cost of each upgrade option; and a solver component executing computer software operating upon a computing system which performs the steps of:

(a) initializing all slots within all routers by which targeted traffic is switched independent within all points of presence (Pops) within the communication network to have—network monitoring service deployed;

(b) calculating absolute savings of removing the network monitoring service for each slot within each router that has the network monitoring service deployed for each option of monitoring customer traffic only, monitoring peering traffic only, and monitoring both customer and peering traffic;

(c) normalizing the calculated absolute savings based on an optimum location for covering consumer traffic, wherein the optimum location comprises one of a gateway-customer interface, a gateway-backbone interface, a backbone-gateway interface, a backbone interface, or a backbone/shared-tenant interface;

(d) comparing the absolute calculated savings of removing the network monitoring service from each slot within each router that has the network monitoring service deployed;

(e) selecting a first slot on a first router with a highest absolute calculated savings to remove the network monitoring service;

(f) calculating a percentage of a type of overall traffic covered across the communication network by network monitoring service after removing the network monitoring service from the selected slot on the first router; and (g) continuing steps (b) through (e) until the percentage of the type of overall traffic covered across the communication network is less than or equal to the selected percentage of the type of overall traffic coverage across the communication network.

9. The system of claim 8, wherein the solver component further performs the step of adding the network monitoring service back to a most recent slot to have the network monitoring service removed if the calculated percentage of the type of overall traffic covered across the communication network is less than the selected percentage of the type of overall traffic coverage across the communication network.

10. The system of claim 8, wherein the solver component further performs the step of selecting a slot with the least percentage of overall traffic across the communication network in the case where multiple slots have the same calculated cost.

11. The system of claim 8, further comprising a constraint component to store constraints comprising a maximum number of routers that can be supported by a collector.

* * * * *